United States Patent [19]

DiMaggio

[11] Patent Number: 5,012,585
[45] Date of Patent: May 7, 1991

[54] LASER PLUMB-BOB APPARATUS

[76] Inventor: Charlie J. DiMaggio, 1776-72 St., Brooklyn, N.Y. 11204

[21] Appl. No.: 519,807

[22] Filed: May 7, 1990

[51] Int. Cl.$^5$ ............................................. G01C 15/02
[52] U.S. Cl. ........................................ 33/286; 33/291; 33/227
[58] Field of Search ................. 33/227, 228, 290, 291, 33/286, DIG. 21, 391, 397

[56] References Cited

U.S. PATENT DOCUMENTS

| 2,517,295 | 8/1950 | Esher | 33/397 X |
| 3,505,739 | 4/1970 | Abrams | 33/666 X |
| 3,588,249 | 6/1971 | Studebaker | 33/290 |
| 3,911,588 | 10/1975 | Ohneda | 33/286 |
| 4,053,239 | 10/1977 | Tolmon | 356/149 X |

FOREIGN PATENT DOCUMENTS 945133 11/1948 France ............................... 33/286

Primary Examiner—Harry N. Haroian
Attorney, Agent, or Firm—Leon Gilden

[57] ABSTRACT

An apparatus is set forth for providing vertical alignment and indication of a fixture positioning within a dwelling relative to a floor plan reference point, wherein the apparatus includes a laser oscillator mounted within a lower first housing coaxially aligned through a second and third upper coaxially aligned housing to focus a laser beam onto the ceiling surface of the associated dwelling. A spherical housing is provided medially of the coaxially aligned first and second housings and includes support members for positioning of the housing upon a support surface, such as a floor, or optionally utilizes ring members and associated tether lines to suspend the organization relative to vertical support surfaces.

3 Claims, 4 Drawing Sheets

PRIOR ART

LASER PLUMB-BOB APPARATUS

BACKGROUND OF THE INVENTION

1. Field of the Invention

The field of invention relates to alignment apparatus, and more particularly pertains to a new and improved laser plumb-bob apparatus wherein the same permits vertical alignment and indication of a fixture positioning overlying a reference position of a floor.

2. Description of the Prior Art

The prior art has provided various alignment apparatus for use in associating various reference positions within a fixed environment. The prior art has heretofore, however, failed to set forth a vertical plumb-bob type apparatus medially positionable minimizing requirement of an assistant individual in providing a reference position relative to an underlying floor surface. Examples of various prior art alignment and positioning apparatus may be found in U.S. Pat. No. 4,841,136 to Nakayama, et al. wherein a citing apparatus utilizes a laser emitting source directing the laser beam in any horizontal orientation by remote control for use in a sliding arrangement.

U.S. Pat. No. 4,592,147 to Herman sets forth a chamber utilizing a plumb-bob and an infra-red transmitter and receiver to permit proper alignment of a plumb-bob relative to the thusly transmitted electrical output of the organization.

U.S. Pat. No. 4,694,584 to Mills sets forth an inclinometer as a celestial and navigational instrument.

U.S. Pat. No. 4,625,423 to Sackett sets forth a gauge for inclination measurement electronically utilizing light emitting diodes and photo-transistors to provide inclination and visual indication of the associated angle defined thereby.

U.S. Pat. No. 4,556,799 to Rolando sets forth a motion sensing apparatus utilizing a mercury globule supported on an opaque concave surface utilizing photocell output for association with the mercury for sensing motion of the mercury relative to its association support surface.

As such, it may be appreciated that there continues to be a need for a new and improved laser plumb-bob apparatus wherein the same addresses both the problems of ease of use, as well as effectiveness in construction in defining and visually indicating vertical alignment of an overhead surface relative to an underlying surface and in this respect, the present invention substantially fulfills this need.

SUMMARY OF THE INVENTION

In view of the foregoing disadvantages inherent in the known types of indicator apparatus now present in the prior art, the present invention provides a laser plumb-bob apparatus wherein the same utilizes a laser light beam to align an overlying surface relative to an underlying surface. As such, the general purpose of the present invention, which will be described subsequently in greater detail, is to provide a new and improved laser plumb-bob apparatus which has all the advantages of the prior art plumb-bob apparatus and none of the disadvantages.

To attain this, the present invention provides an apparatus for providing vertical alignment and indication of a fixture positioning within a dwelling relative to a floor plan reference point, wherein the apparatus includes a laser oscillator mounted within a lower first housing coaxially aligned through a second and third upper coaxially aligned housing to focus a laser beam onto the ceiling surface of the associated dwelling. A spherical housing is provided medially of the coaxially aligned first and second housing and includes support members for positioning of the housing upon a support surface, such as a floor, or optionally utilizes ring members and associated tether lines to suspend the organization relative to vertical support surfaces.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Tradmark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved laser plumb-bob apparatus which has all the advantages of the prior art alignment apparatus and none of the disadvantages.

It is another object of the present invention to provide a new and improved laser plumb-bob apparatus which may be easily and efficiently manufactured and marketed.

It is a further object of the present invention to provide a new and improved laser plumb-bob apparatus which is of a durable and reliable construction.

An even further object of the present invention is to provide a new and improved laser plumb-bob apparatus which is susceptible of a low cost of manufacture with regard to both materials and labor, and which accordingly is then susceptible of low prices of sale to the consuming public, thereby making such laser plumb-bob apparatus economically available to the buying public.

Still yet another object of the present invention is to provide a new and improved laser plumb-bob apparatus which provides in the apparatuses and methods of the prior art some of the advantages thereof, while simultaneously overcoming some of the disadvantages normally associated therewith.

Still another object of the present invention is to provide a new and improved laser plumb-bob apparatus wherein the same utilizes a focusing lens to align a laser light beam with an underlying reference point for indication of positioning of a fixture overlying the reference point.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
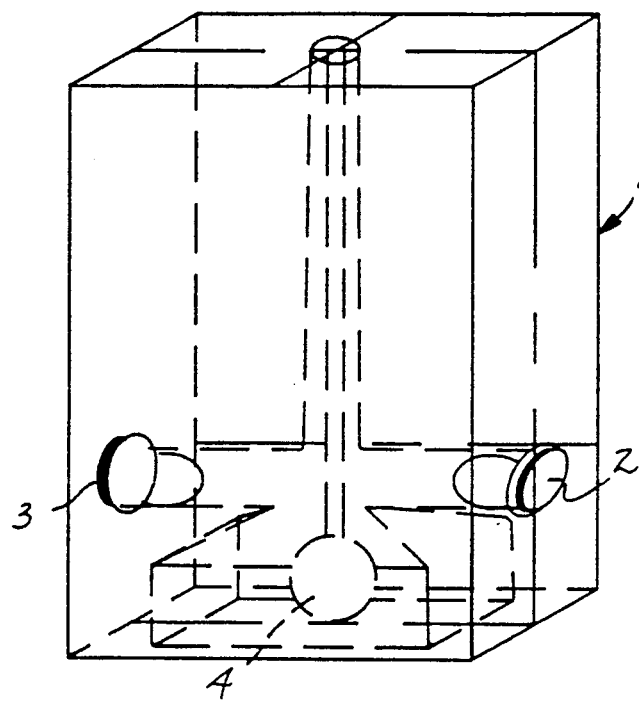
FIG. 1 is an isometric illustration of a prior art indicator apparatus.

With reference now to the drawings, and in particular to FIGS. 1 to 8 thereof, a new and improved laser plumb-bob apparatus embodying the principles and concepts of the present invention and generally designated by the reference numerals 10 and 10a will be described.

Figure 2:
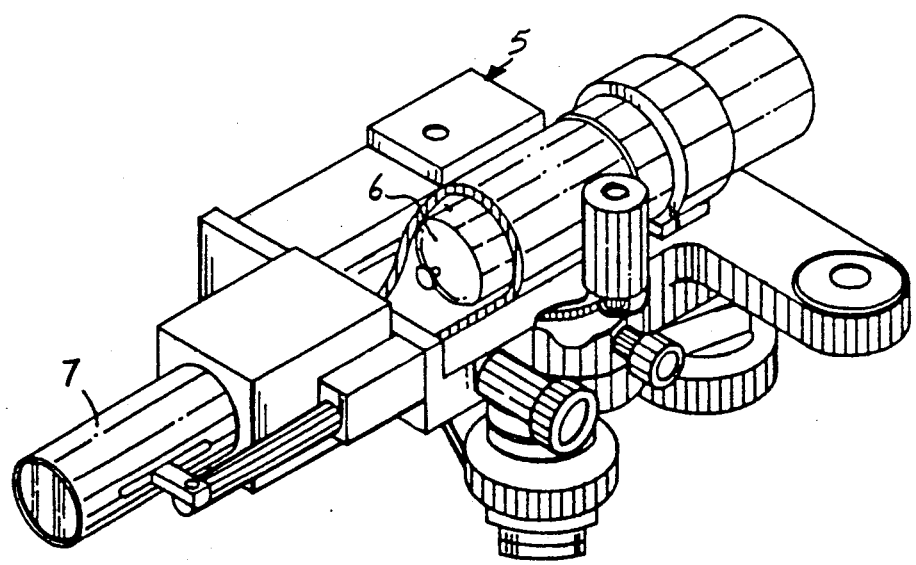
FIG. 2 is an isometric illustration, partially in section, of a prior art horizontal alignment apparatus.

FIG. 1 illustrates a prior art angular orientation device, wherein the central housing includes an infra-red transmitter 2 in association with an infra-red receiver 3 for alignment of a medially positioned plumb-bob 4 to take angular orientation in use. FIG. 2 illustrates a prior art horizontal citing apparatus 5 utilizing an optical lens 7 in association with a laser beam oscillator 6, wherein the conventional use of a laser oscillator as set forth in U.S. Pat. No. 4,848,136 is incorporated herein by reference.

Figure 3:
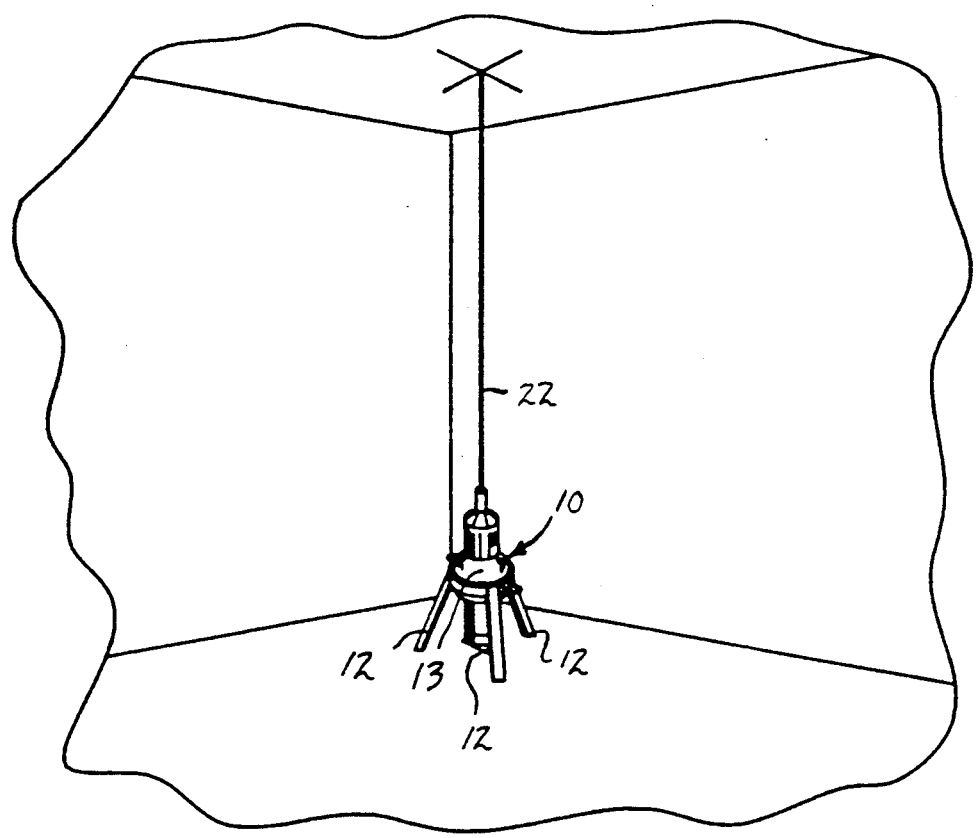
FIG. 3 is an isometric illustration of the instant invention in position within a dwelling.
Figure 7:
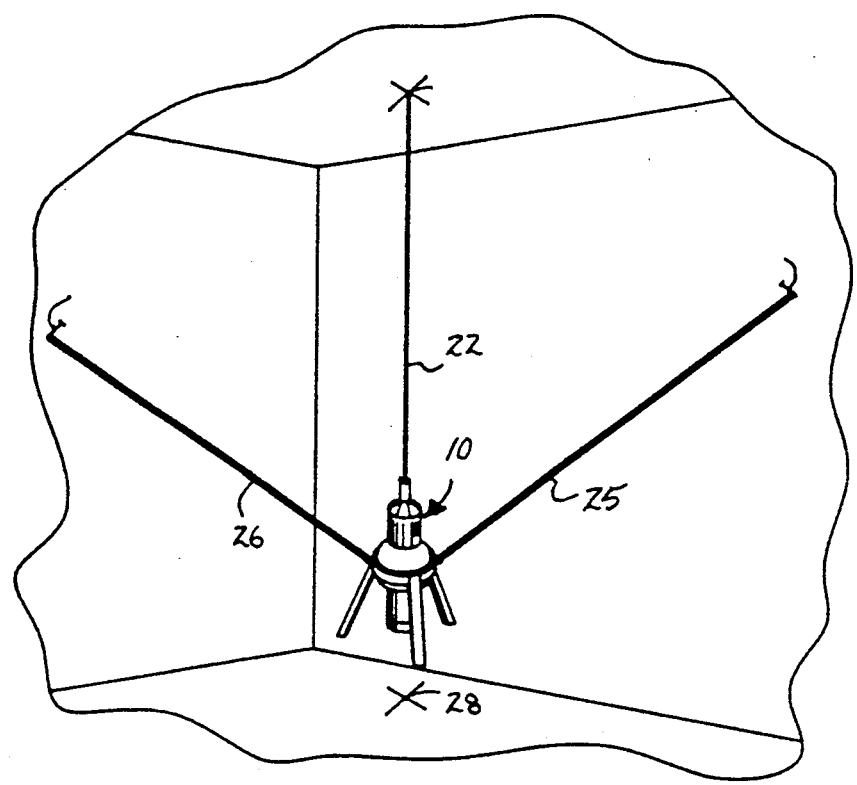
FIG. 7 is a further isometric illustration of the apparatus mounted to vertical support surfaces.

More specifically, the laser plumb-bob apparatus 10 of the instant invention essentially comprises a spherical housing 13 defined by a first diameter, with a ring support 11 rotatably mounted about the cylindrical housing. The ring support 11 includes a concave interior surface defined by a complementary configuration to receive the exterior surface of the cylindrical housing 13 in a captured relationship. The ring support 11 includes a trio of splayed tripod legs 12 of an equal predetermined length integrally and downwardly secured relative thereto. The tripod legs 12 extend below a first cylindrical housing 14 defined by a second diameter less than that of the first diameter, with a battery pack housing 15 removably mounted thereunder. The first cylindrical housing 14 includes a laser oscillator 16 secured therewithin selectively operative by use of an on/off switch 21 conveniently mounted as required on the apparatus. A second cylindrical housing 17 is spaced above the first cylindrical housing in a coaxially aligned relationship relative thereto fixedly secured to the spherical housing 13. A third cylindrical housing 18 is telescopingly mounted within the second cylindrical housing. The second cylindrical housing includes an objective lens 19 aligned with the laser oscillator 16, and wherein the third cylindrical housing 18 includes a focusing lens 20 mounted therein to precisely focus the focusing lens 20 to provide a relatively sharp image upon a ceiling surface, as illustrated in FIG. 3, relative to a floor support surface (as illustrated in FIG. 7) to aligned a reference position 28 upon the floor, with a fixture indication point 27 upon the ceiling. Inasmuch as the spherical housing 13 is rotatably captured and mounted within the concave interior surface of the ring support 11, vertical alignment is provided regardless of the relative planar relationship of the floor and ceiling surfaces by use of the laser beam 22 directed from the laser oscillator 16 through the objective and focusing lens 19 and 20 respectively. The use of a laser oscillator to direct a laser beam is of conventional technology, and its use is exemplified in U.S. Pat. No. 4,841,136 incorporated herein by reference.

Figure 4:
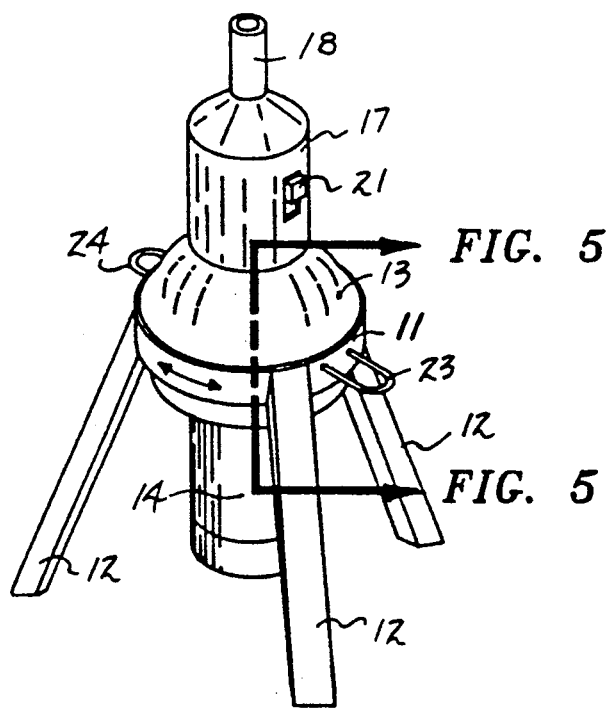
FIG. 4 is an isometric illustration of the instant invention.
Figure 5:
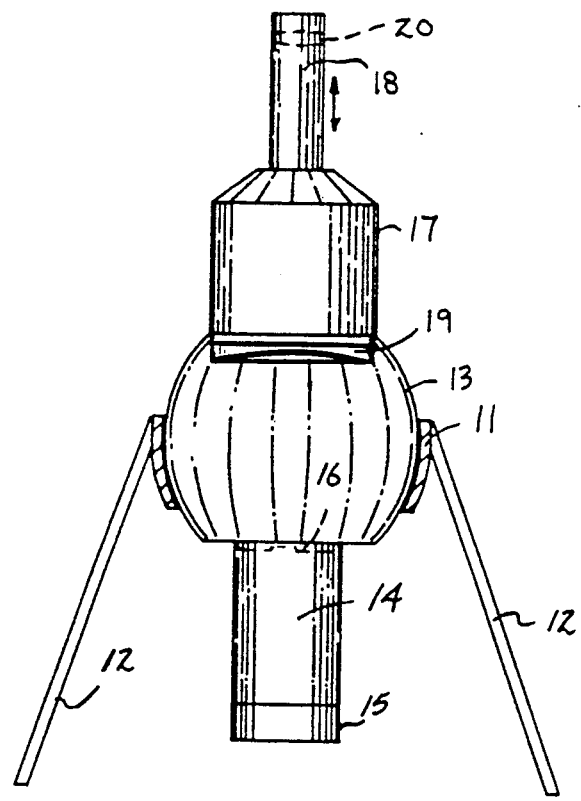
FIG. 5 is an orthographic view, taken along the lines 5—5 of FIG. 4, in the direction indicated by the arrows.
Figure 6:
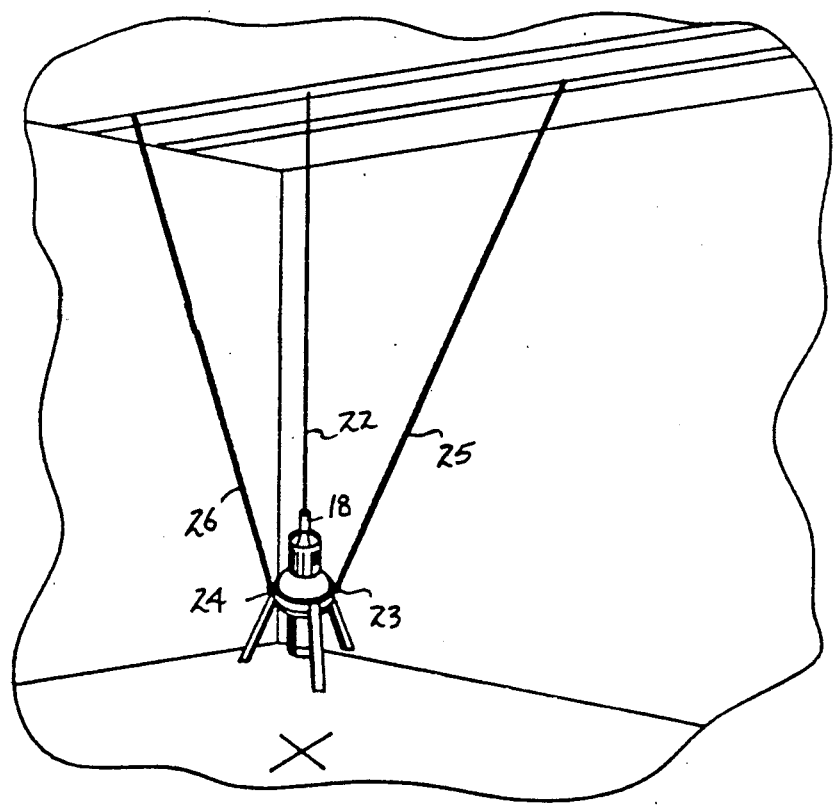
FIG. 6 is an isometric illustration of the instant invention in a suspended orientation relative to an underlying reference point.

Reference to FIG. 4 for example illustrates the use of a first and second support ring 23 and 24 fixedly mounted to an exterior surface of the ring support 11, wherein the first and second support rings are diametrically aligned relative to one another and opposed in diametrically opposed positions upon the ring support 11. A first tether line 25 is mounted to the first support ring 23, with a second tether line 26 mounted to the second support ring 24 to permit securement of the apparatus by use of conventional fasteners, such as nails "N", to secure the tether lines to vertical support surfaces.

Figure 8:
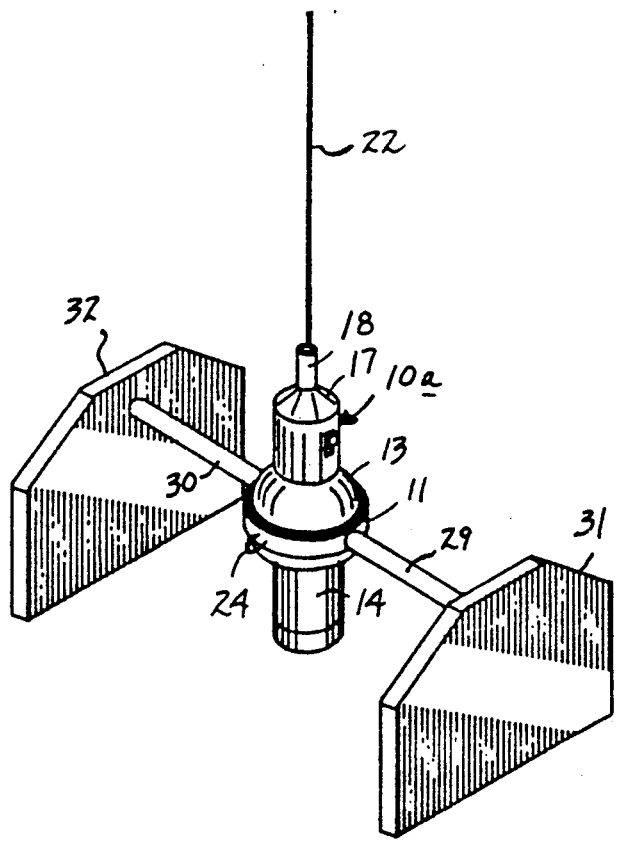
FIG. 8 is an isometric illustration of a modified laser plumb-bob apparatus utilizing a modified support stand organization.
Figure 7:
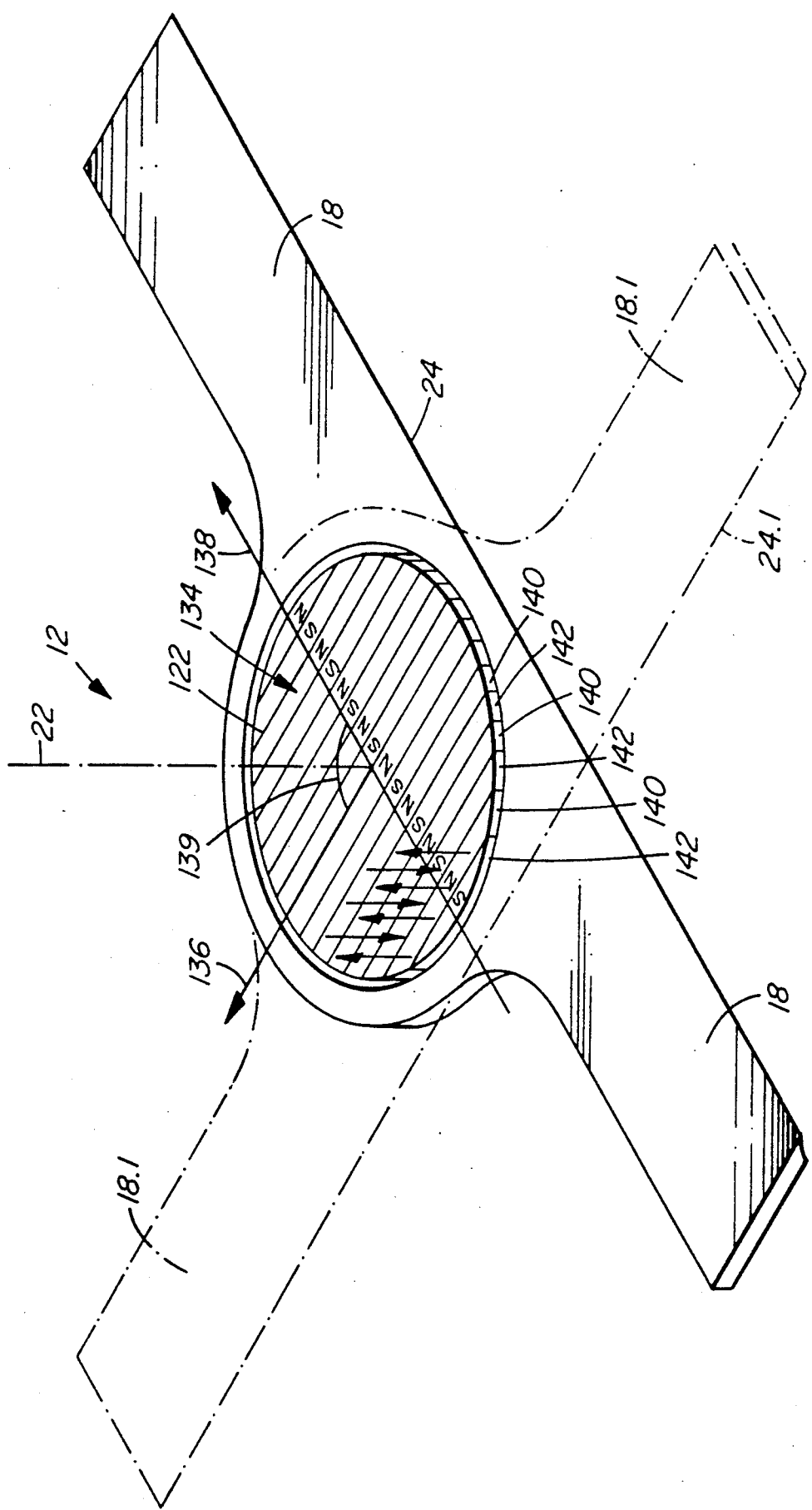
Figure 8:
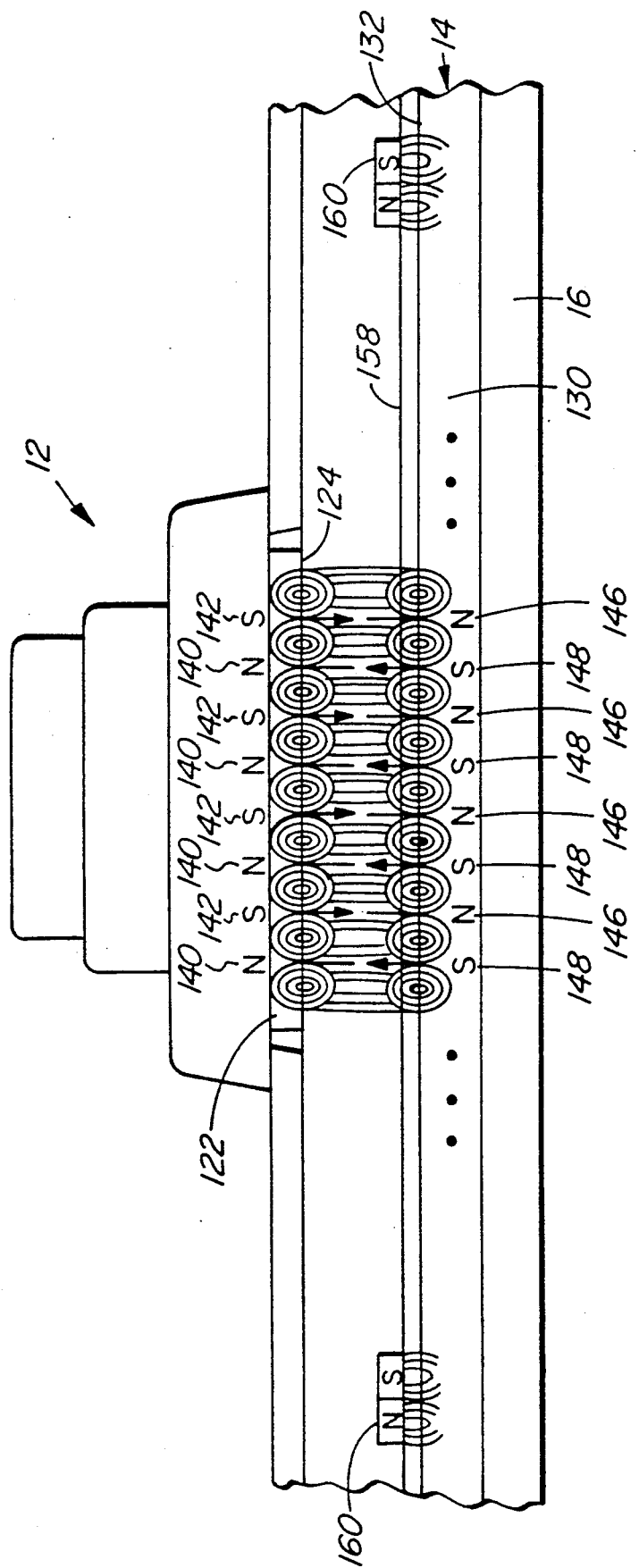
Figure 9:
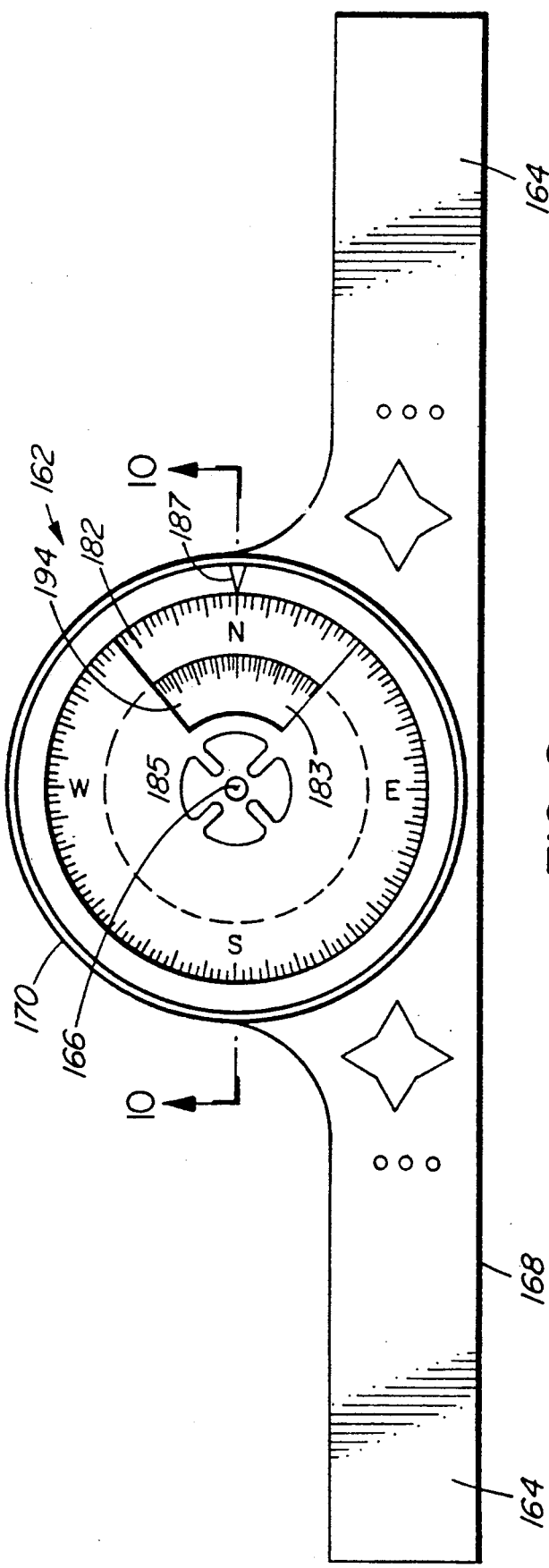
Figure 10:
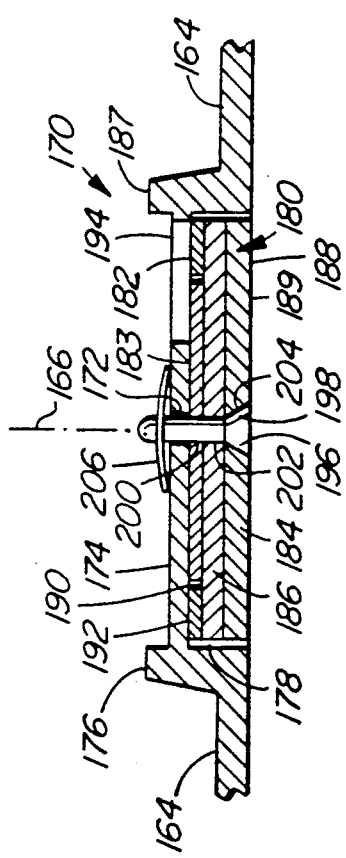

FIG. 8 illustrates a modified apparatus 10a utilizing a first rod arm 29 and a second rod arm 30 diametrically aligned with the ring support 11 and arranged generally orthogonally to the axis of the coaxially aligned first, second, and third cylindrical housings 14, 17, and 18. Each rod arm includes a respective first and second support plate 31 and 32 mounted orthogonally to each terminal end of the first and second rod arms 29 and 30, wherein each support plate 31 and 32 includes a planar bottom surface that is aligned orthogonally relative to the axis of the coaxially aligned cylindrical housings to orthogonally orient the apparatus as required in a stable relationship relative to a support surface. Further, the first and second rings 23 and 24 are also utilized and are arranged rotated at ninety degrees relative to the first and second rod arms to provide clearance and access to the support rings for securement of the tether lines 25 and 26 thereto, as required.

As to the manner of usage and operation of the instant invention, the same should be apparent from the above disclosure, and accordingly no further discussion relative to the manner of usage and operation of the instant invention shall be required.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A laser plumb-bob apparatus comprising,
a spherical hollow housing, the housing including a first cylindrical housing mounted underlying the spherical housing, and
ring support rotatably mounted about the spherical housing, the ring support including support members mounted to the ring support, the support members defined by a predetermined length, and
the cylindrical housing defined by a further predetermined length, wherein the predetermined length is greater than the further predetermined length, and
a laser oscillator mounted within the cylindrical housing, the laser oscillator arranged for directing a laser beam through the spherical housing coaxially aligned with the cylindrical housing, and
wherein the ring support defines a concave interior surface, the concave interior surface complementarily aligned to the spherical housing to capture and secure the ring support the spherical housing, and further including a second cylindrical housing coaxially aligned with the cylindrical housing, the second cylindrical housing mounted to the spherical housing diametrically opposed about the spherical housing to the cylindrical housing, and a third cylindrical housing telescopingly mounted within the second cylindrical housing, the cylindrical housing, the second cylindrical housing, and the third cylindrical housing coaxially aligned relative to one another, and the second cylindrical housing including an objective lens mounted orthogonally to an axis defined by the second cylindrical housing, and a focusing lens mounted within the third cylindrical housing, wherein the focusing lens is arranged parallel to the objective lens, and
wherein the cylindrical housing includes a battery pack mounted to a lowermost portion of the cylindrical housing providing electrical energy to the laser oscillator, and
wherein the ring support includes a first support ring integrally mounted thereto, wherein the first support ring is mounted to an exterior surface of the ring support, and a second support ring mounted to the exterior surface of the ring support diametrically opposed to the first support ring, and a first tether line secured to the first support ring, and a second tether line secured to the second support ring, wherein the first and second tether lines permit securement of the apparatus to spaced vertical support surfaces.

2. An apparatus as set forth in claim 1 wherein the support members include a plurality of legs integrally mounted to the ring support.

3. An apparatus as set forth in claim 1 wherein the support members include a first rod arm mounted integrally to the ring support, and a second rod arm diametrically aligned with the first rod arm mounted to the ring support in a diametrically opposed relationship relative to the first rod arm, the first rod arm and the second rod arm displaced ninety degrees relative to the first support ring and the second support ring, and the first rod arm including a first support plate orthogonally mounted to the first rod arm, and the second rod arm including a second support plate mounted to the second rod arm, and each support plate including a planar bottom surface, each planar bottom surface orthogonally aligned relative to a common axis defined by the cylindrical housing, the second cylindrical housing, and the third cylindrical housing.

* * * * *